3,041,288
METHOD OF MANUFACTURING MICROSCOPIC CAPSULES HAVING WALLS OF ALCOHOL-FRACTIONATED GELATIN
William Henry Anthony, London, England, assignor to The National Cash Register Company, Dayton, Ohio, a corporation of Maryland
No Drawing. Filed Dec. 22, 1958, Ser. No. 781,898
1 Claim (Cl. 252—316)

This invention relates to improvements in making microscopic capsules of gelled hydrophilic colloid material, each of which capsules contains within its walls a single drop of water-immiscible liquid material. This is an improvement over the capsules disclosed in United States Letters Patent No. 2,800,457, which issued on July 23, 1957, on the application of Barrett K. Green and Lowell Schleicher, the improvement of this invention having two aspects, the first aspect of which is the formation of the capsule walls out of high molecular weight gelatin fractions of narrow molecular weight distribution, and by use of such wall material eliminating the tendency of the capsules to aggregate when dispersed in a liquid. The second aspect is that the fractionated portion of the gelatin utilized is of relatively high molecular weight and when deposited on the drops makes strong walls around them, as will be described, before any aggregation can occur.

The capsules of this invention are of the order of one to three microns in diameter.

The fractionating process will be explained in connection with the making of the capsules, and a typical example will be given.

Starting with pigskin gelatin having its isoelectric point at pH 8, and which has a pH of 4.5 to 5 when dissolved in hot water, a solution of such gelatin is made with hot water, and the pH is adjusted to 7 with a 20%, by weight, aqueous solution of sodium hydroxide. The ethyl alcohol is added to separate out the higher-molecular-weight gelatin fractions as a heavier liquid layer, which sinks to the bottom of the container, said heavier bottom layer being recovered from beneath the upper layers containing the lighter fractions, and the solvents of the heavier layer material being allowed to evaporate to form a stiff jelly. The stiff jelly then is thoroughly dried and comminuted. Then, 20.1 grams of the comminuted and dried selectively fractioned high-molecular-weight gelatin is dissolved in 159 grams of hot distilled water. This newly-formed gelatin solution will provide the material which forms the capsule walls and will act as a liquid medium in which the remainder of the process is carried on. A liquid drop phase is formed of two parts of trichlorodiphenyl and one part of a light petroleum distillate. The mixture of these water-immiscible liquids is used in the amount of 72.5 grams and is emulsified with the newly-formed gelatin solution to a drop size of from one to three microns. Sixty-three grams of the so-made emulsion is dispersed in 1,725 grams of distilled water at 50 degrees centigrade. The pH of the emulsion is adjusted to 7, and a solution of 5.8 grams of gum arabic in two hundred milliliters of water, also of pH 7, is added and stirred in. The resulting mixture is cooled to 8 degrees centigrade and is acidified to pH 4.3 with 10 percent acetic acid in water, by weight, which acidification should be done over a period of about a half hour.

The foregoing procedure results in a coacervation phenomenon in which the water-immiscible liquid droplets are encased singly in gelled high-molecular-weight gelatin material.

To harden and strengthen the capsules resulting from the foregoing coacervation, the capsules and the suspending liquid are treated with .95 milliliter of 37 percent solution, by weight, of formaldehyde in water. After one half hour or more, the pH is raised to 10.5, to aid in the hardening action of the formaldehyde.

The capsules so formed are discrete and do not tend to aggregate, as do capsules which are made of unfractionated gelatin.

The capsules made by the above procedure, being of very small size, impermeable to the contained liquid, and discrete, with no tendency to aggregate, are useful in applications where it is desired to utilize these liquid-containing capsules where aggregations of them cannot be tolerated. An example of the utility of these capsules is in the field where the encapsulated liquid may be changed in color by the application of light thereto, of the proper wave length. The fact that the capsules are discrete allows for very fine definition of coloration. In other applications, the liquid in the capsules may be of coloring material or of color-reactant material, such capsules being incorporated in the furnish of paper, so as to be embedded therein, and the liquid being thereafter released by pressure at the desired points.

What is claimed is:

An improvement in the method of manufacture of microscopic capsules having walls of gelled gelatin, each capsule containing a water-immiscible fluid; said improvement method resulting in capsule walls with a high molecular weight alcohol-extract of gelatin, and which method comprises the steps of dissolving said high molecular weight gelatin extract in a major proportion of water; emulsifying therein a minor proportion of a water-immiscible fluid; dispersing an amount of said emulsion in water maintained at about 50 degrees centigrade in a weight ratio of about 1:27, respectively, adjusting the pH to 7, adding to said dispersion with continuous stirring a dilute aqueous solution of gum arabic also adjusted to pH 7, the gum-arabic-gelatin ratio being approximately 5.8/5, by weight, and forming discrete capsules by coacervation of the high molecular weight gelatin and gum arabic by simultaneously acidifying to pH 4.3 and cooling the mixture to about 8 degrees centigrade; said high molecular weight gelatin extract being prepared by mixing ethyl alcohol with a warm aqueous solution of gelatin having its iso-electric point at pH 8, allowing the fraction containing the alcohol extracted high molecular weight gelatin to settle out, separating said fraction, and drying and comminuting the extract after evaporation of the volatile solvents therefrom.

References Cited in the file of this patent
UNITED STATES PATENTS
2,800,457    Green et al. _____ July 23, 1957